US008548057B2

(12) United States Patent  
Li et al.

(10) Patent No.: US 8,548,057 B2  
(45) Date of Patent: Oct. 1, 2013

(54) VIDEO CODING REDUNDANCY REDUCTION

(75) Inventors: Bin Li, Hefei (CN); Jizheng Xu, Beijing (CN); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 295 days.

(21) Appl. No.: 13/013,086

(22) Filed: Jan. 25, 2011

(65) Prior Publication Data

US 2012/0189056 A1    Jul. 26, 2012

(51) Int. Cl.
*H04B 1/66* (2006.01)
*G06K 9/36* (2006.01)

(52) U.S. Cl.
USPC ..................................... 375/240.15; 382/233

(58) Field of Classification Search
USPC .................. 348/390.1, 423.1, 699; 382/240, 382/253, 249, 239, 238, 248, 281, 233, 236, 382/232; 375/240.02–240.27
See application file for complete search history.

(56) References Cited

U.S. PATENT DOCUMENTS

| | | | | |
|---|---|---|---|---|
| 4,821,290 A | * | 4/1989 | Hingorani et al. | 375/242 |
| 5,453,936 A | * | 9/1995 | Kurosawa | 716/102 |
| 6,931,067 B2 | | 8/2005 | Jang | |
| 6,990,246 B1 | | 1/2006 | Ferguson | |
| 7,403,136 B2 | * | 7/2008 | De La Cruz et al. | 341/51 |
| 7,444,029 B2 | | 10/2008 | Shen et al. | |
| 7,609,763 B2 | | 10/2009 | Mukerjee et al. | |
| 2006/0072662 A1 | | 4/2006 | Tourapis et al. | |
| 2007/0081588 A1 | | 4/2007 | Raveendran et al. | |

OTHER PUBLICATIONS

Marpe et al., "Very Low Bit-Rate Video Coding Using Wavelet-Based Techniques", IEEE Transactions on Circuits and Systems for Video Technology, vol. 9, No. 1, Feb. 1999, pp. 85-94.
Robinson et al., "Zerotree Pattern Coding of Motion Picture Residues for Error-Resilient Transmission of Video Sequences", IEEE Journal on Selected Areas in Communications, vol. 18, No. 6, Jun. 2000, pp. 1099-1110.
Rodrigues et al., "H.264/AVC Based Video Coding Using Multiscale Recurrent Patterns: First Results", retrieved on Nov. 3, 2010 at <<http://www02.lps.ufrj.br/~eduardo/eduardo_oficial/papers/cI5.pdf>>, Feb. 2006, 4 pages.
Wang et al., "Error Resilient Video Coding Techniques", Signal Processing Magazine, IEEE, vol. 17, No. 4, Jul. 2000, pp. 61-82.

* cited by examiner

*Primary Examiner* — Behrooz Senfi
(74) *Attorney, Agent, or Firm* — Lee & Hayes, PLLC

(57) ABSTRACT

Embodiments for reducing redundancy in video coding are disclosed. In accordance with at least one embodiment, video content is represented as a tree structure in which the nodes of the tree structure are associated with attributes of the video content. An encoder analyzes the nodes to determine whether there is redundancy associated with a last node of a divided node. In another embodiment, bidirectional prediction video coding techniques are applied to the video content. The encoder analyzes two lists of reference frames to determine whether a third mode of bidirectional prediction is redundant to a second mode of bidirectional prediction. The efficiency of video coding is improved by refraining from sending data symbols to the decoder in the event that the video coding techniques contain redundancy.

16 Claims, 6 Drawing Sheets

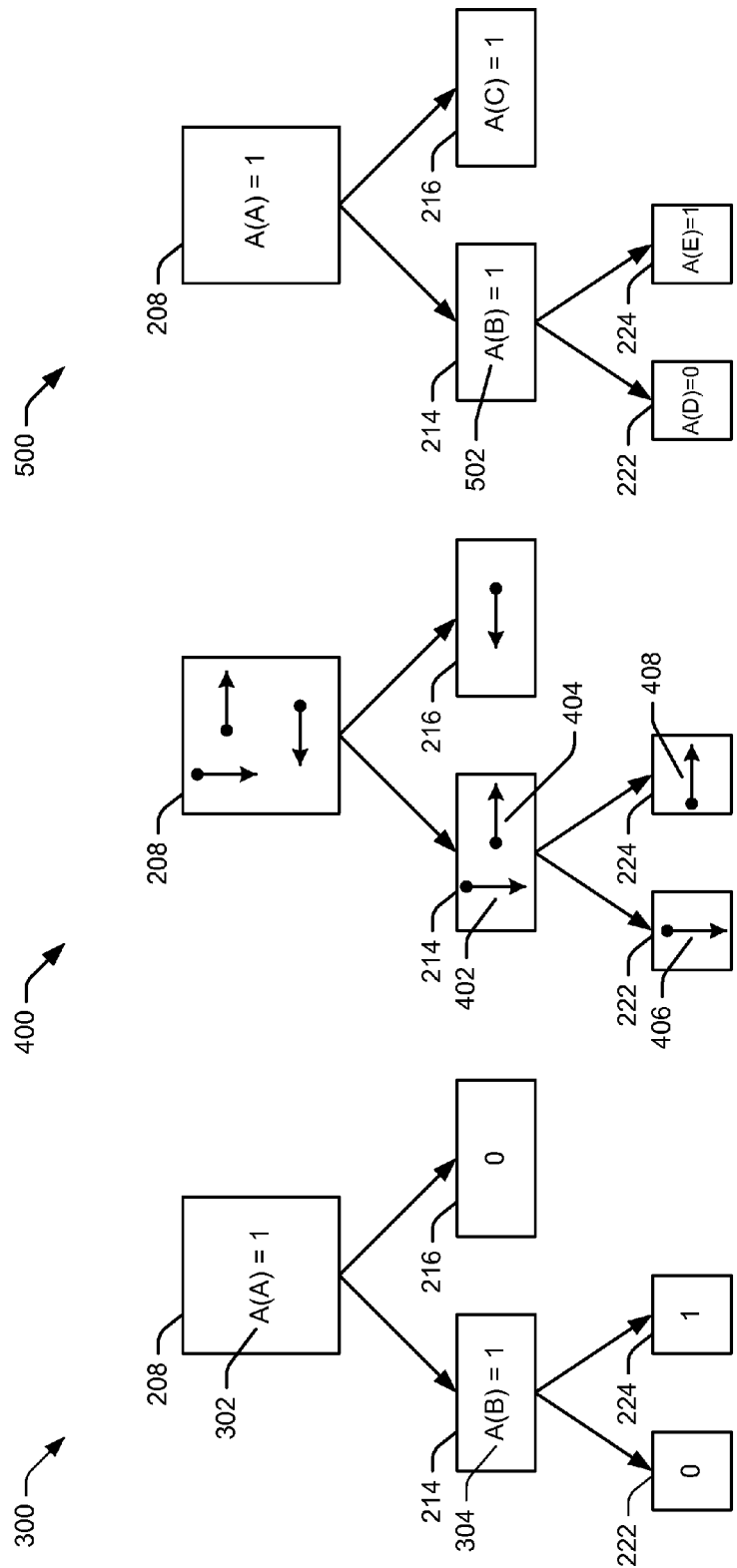

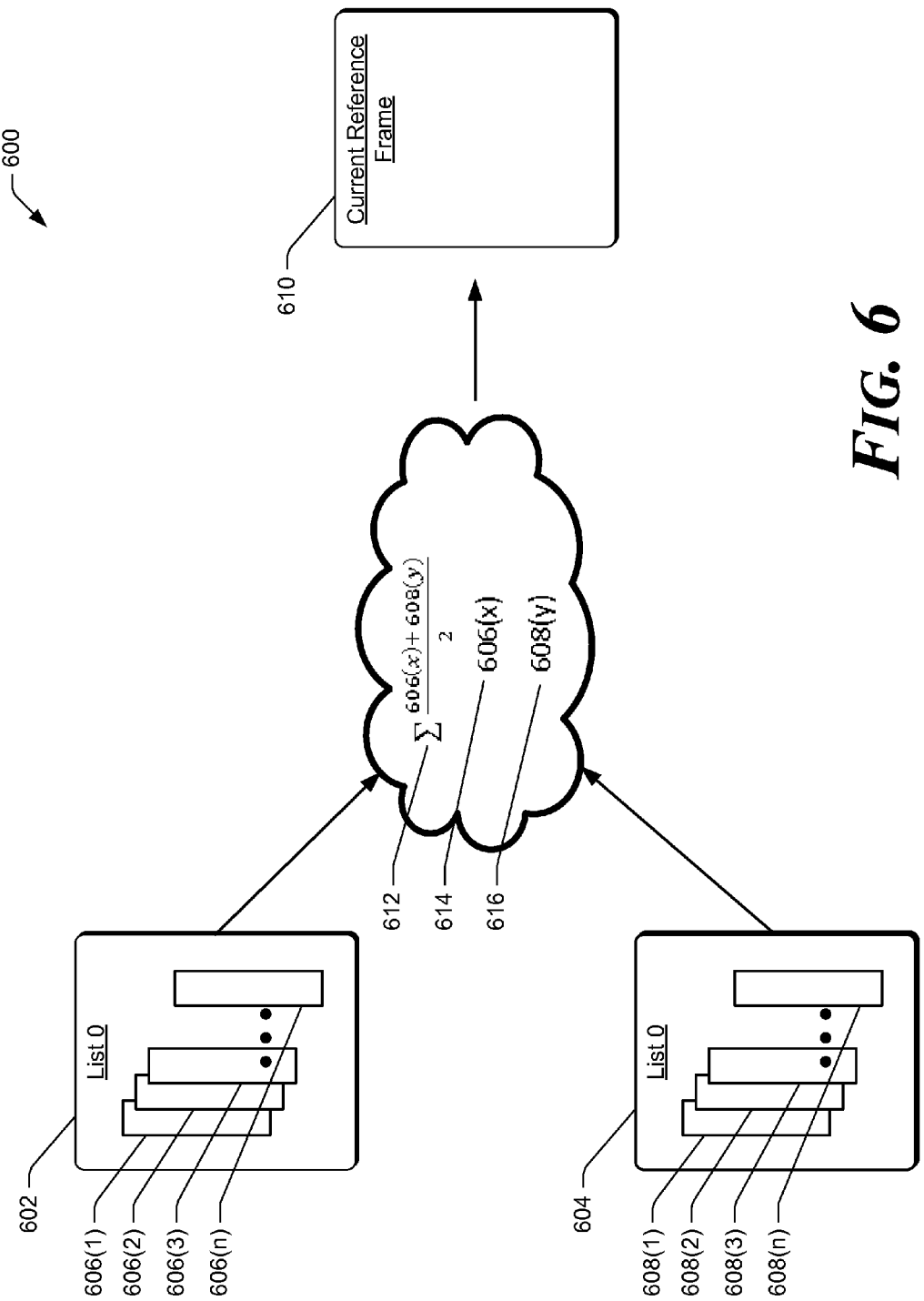

VIDEO CODING REDUNDANCY REDUCTION

BACKGROUND

The delivery of video content generally offers a much richer user experience than static images and text. For example, a user who desires to catch up on the daily news may prefer to watch a video of a news broadcast on their mobile phone rather than to read a transcript of the news. Accordingly, the efficient and reliable delivery of video content is critical to creating a rich user experience. Since video content generally requires more memory and network bandwidth than other data types, delivering video content over networks, such as the Internet and wireless networks, may present challenges such as efficiency, reliability, and network capacity.

To promote efficient delivery, video content is typically encoded prior to delivery to reduce the amount of data actually being transferred over the network. One common type of video compression is a motion-compensation-based video coding scheme, which is used in such coding standards as MPEG-1, MPEG-2, MPEG-4, H.261, H.263, and H.264/AVC. In such coding standards, video images are sampled and transformed into coefficients that capture the variation in pixels across the image. The coefficients are then quantized and transmitted to a decoder. The decoder is able to decode the image by performing operations that are substantially the inverse of the encoding operations.

While current video coding techniques promote efficient delivery video content, such techniques may contain redundancy.

SUMMARY

Described herein are techniques and systems for reducing redundancy in video coding. At least two separate types of redundancy are reduced with use of the system and techniques described herein. The first type of redundancy is associated with tree structure video coding, while the second type of redundancy is associated with bidirectional prediction video coding.

In tree structure video coding, each frame of a video stream is separated into coding units, with each of the coding units being organized into a hierarchical structure (i.e., a tree structure) based on attributes of the coding unit. Unlike previous tree structure video coding techniques which send data (i.e., bits) to the decoder for each node in the tree structure regardless of the preceding nodes, the tree structure video coding techniques described herein reduce redundancy by determining whether data pertaining to the last node should be sent based on attributes of the preceding nodes.

In bidirectional prediction video coding, three modes (one bidirectional and two unidirectional) are applied to two lists of references frames to predict each prediction unit for a current reference frame. Whereas previous bidirectional prediction video coding techniques send data (i.e., bits) to the decoder for each of the three modes regardless of the reference frames contained in the lists, the bidirectional prediction video coding techniques described herein reduce redundancy by determining whether data pertaining to the third mode should be sent based on the reference frames contained in the lists.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the Figure in which the reference number first appears. The use of the same reference number in different figures indicates similar or identical items.

FIG. 3 shows an illustrative tree structure based on coded-block-flag (CBF) attributes.

FIG. 4 shows an illustrative tree structure based on merge-and-skip attributes.

FIG. 5 shows an illustrative tree structure based on adaptive-loop-filter (ALF) attributes.

FIG. 6 shows illustrative bidirectional prediction video coding.

DETAILED DESCRIPTION

Figure 1:
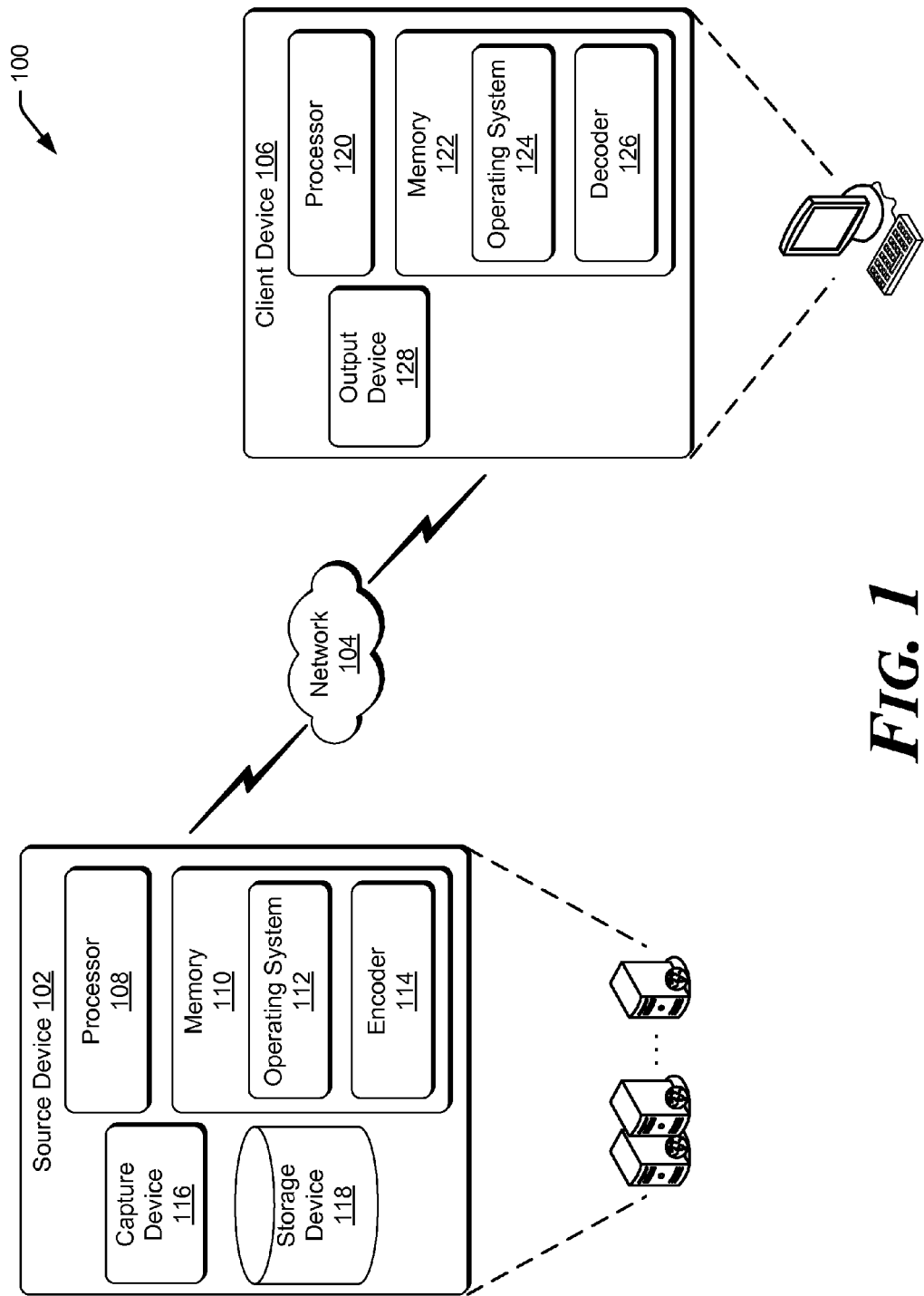
FIG. 1 shows a block diagram that illustrates a computing environment for reducing redundancy in video coding, in accordance with various embodiments.

The embodiments described herein pertain to reducing redundancy in video coding. Two types of redundancy in video coding are recognized and solutions are presented to address each type of redundancy. First, tree structure redundancy reduction techniques reduce redundancy in situations where video content is represented using a tree structure. Second, bidirectional prediction redundancy reduction techniques reduce redundancy in situations where current frames are predicted bi-directionally using reference frame lists.

In tree structure video coding, video content is represented by a tree structure in which nodes of the tree denote a group of signals of the video content. For example, a 16×16 block of pixels can denote a root node in a tree structure. If the signals within a node have similar attributes, e.g., a fixed pixel value, then the group of pixels within that node efficiently represents the attributes of that block. However, if the pixels within a node have different attributes, that node is split into several sub-regions. If the pixels within a sub-region still have different attributes, it can be split even further. Once the tree structure is generated, the attributes of the nodes are analyzed. In the event that each preceding node of a divided node share similar attributes, it follows that the last node has attributes unique from the previous nodes. Accordingly, in such situations, data corresponding to the attributes of the last node should not be sent to the decoder.

Whereas previous video coding techniques send data (i.e., bits) to the decoder for each node in the tree structure regardless of the preceding nodes, the video coding techniques described herein reduce redundancy by determining whether it is necessary to send data pertaining to the last node based on attributes of the preceding nodes. Thus, the video coding techniques described herein reduce the amount of data sent to the decoder by the number of bits required to represent the last node. For example, if node X is divided into nodes $X_1$, $X_2, \ldots, X_n$, and $X_1, X_2, \ldots, X_{n-1}$ have the same attributes, then node $X_n$ has a different attribute otherwise node X would not have been divided. Accordingly, in such situations, the tree structure redundancy reduction techniques refrain from sending data pertaining to the last node to the decoder, thus making the video coding more efficient.

In bidirectional prediction video coding, three modes (one bidirectional and two unidirectional) are applied to two lists of references frames to predict each unit in a current reference frame. For instance, in the first mode one reference frame from each list is selected. Then an average or weighted average of these two reference frames is calculated to predict the current frame. In some instances, the two lists contain the same reference frames. In such instances, the third mode becomes redundant to the second mode. Accordingly, in such situations, data corresponding to the third mode should not be sent to the decoder.

Whereas previous bidirectional prediction video coding techniques use all three modes regardless of the content of the lists, bidirectional prediction redundancy reduction techniques analyze the reference frames of the lists and disable the third mode when the first list and the second list contain the same reference frames. Thus, the video coding techniques described herein reduce the amount of data sent to the decoder by the number of bits required to represent the third mode.

The techniques and systems described herein may be implemented in a number of ways. Example implementations are provided below with reference to the following figures.

Illustrative System

FIG. 1 depicts an illustrative video encoding and decoding system 100 for performing video coding using redundancy reduction techniques, in accordance with various embodiments. The illustrative video encoding and decoding system 100 includes a source device 102 to produce and/or transmit video content over a network 104 to a client device 106. The network 104 may represent of many different types of networks, including the Internet, a LAN (local area network), a WAN (wide area network), a SAN (storage area network), and wireless networks (e.g., satellite, cellular, RF, etc.).

The source device 102 may be implemented in many ways, including as one or more server computers configured to store, process, and distribute video content. The source device 102 may include a processor 108 and a memory 110. The memory 110 of the source device 102 may store an operating system 112 and an encoder 114 to perform video coding techniques. The source device 102 may further include a capture device 116 and a storage device 118. The capture device 116 may acquire captured, pre-captured or computer-generated video content such as by one or more video cameras, an archive containing previously captured video, a live video feed from a video content provider, a video-generating application, etc. The storage device 118 may store the video content. The encoder 114 may encode the video content for transmission from source device to the client device 106 over the network 104.

The client device 106 may be implemented in many ways, including as one or more personal computers, laptop computers, mobile phones, set-top boxes, game consoles, personal digital assistants (PDAs), portable media players (PMPs) (e.g., portable video players (PVPs) and digital audio players (DAPs)), and other types of computing devices. The client device 106 may include a processor 120 and a memory 122. The memory 122 of the client device 106 may store an operating system 124 and a decoder 126 to decode the video content from the source device 102. The client device 106 may additionally include an output device 128 to display the decoded video content to a user.

The encoder 114 and/or decoder 126 may be implemented in software, firmware, and/or hardware and may operate according to a video compression standard, such as MPEG-1, MPEG-2, MPEG-4, H.261, H.263, and H.264/AVC. For example, the encoder 114 and/or decoder 126 may be implemented as one or more microprocessors, digital signal processors, application specific integrated circuits (ASICs), field programmable gate arrays (FPGAs), discrete logic, or any combinations thereof. In some instances, encoder and decoder may be integrated with an audio encoder and decoder, respectively, and include appropriate MUX-DEMUX units, or other hardware and software, to handle encoding of both audio and video in a common data stream or separate data streams. Although the encoder 114 and decoder are shown as a separate standalone module for discussion purposes, the encoder and decoder may be constructed as part of a processor or incorporated into an operating system or other applications.

As noted above, the encoder 114 may encode the video content of the capture device 116 and/or the storage device 118 for transmission from source device to the client device 106 over the network 104. In some implementations, however, the source device 102 and the client device 106 may operate in a substantially-symmetrical manner. For example, each of the source device 102 and the client device 106 may include video encoding and decoding components. Hence, the system 100 may support one-way or two-way video transmission between the source device 102 and the client device 106, such as for video streaming, video broadcasting, video telephony, etc.

The encoder 114 and/or decoder 126 may be configured to support redundancy reduction video coding techniques described herein. In one implementation, the redundancy reduction coding techniques are based on tree structures. For example, the encoder 114 may analyze attributes of tree structure nodes to determine whether data associated with the last node should be sent to the decoder 126.

In another implementation, the redundancy reduction coding techniques are based on bidirectional prediction. For example, the encoder 114 may analyze two lists of reference frames to determine whether the three modes of bidirectional prediction should be utilized.

Tree Structure

Figure 2:
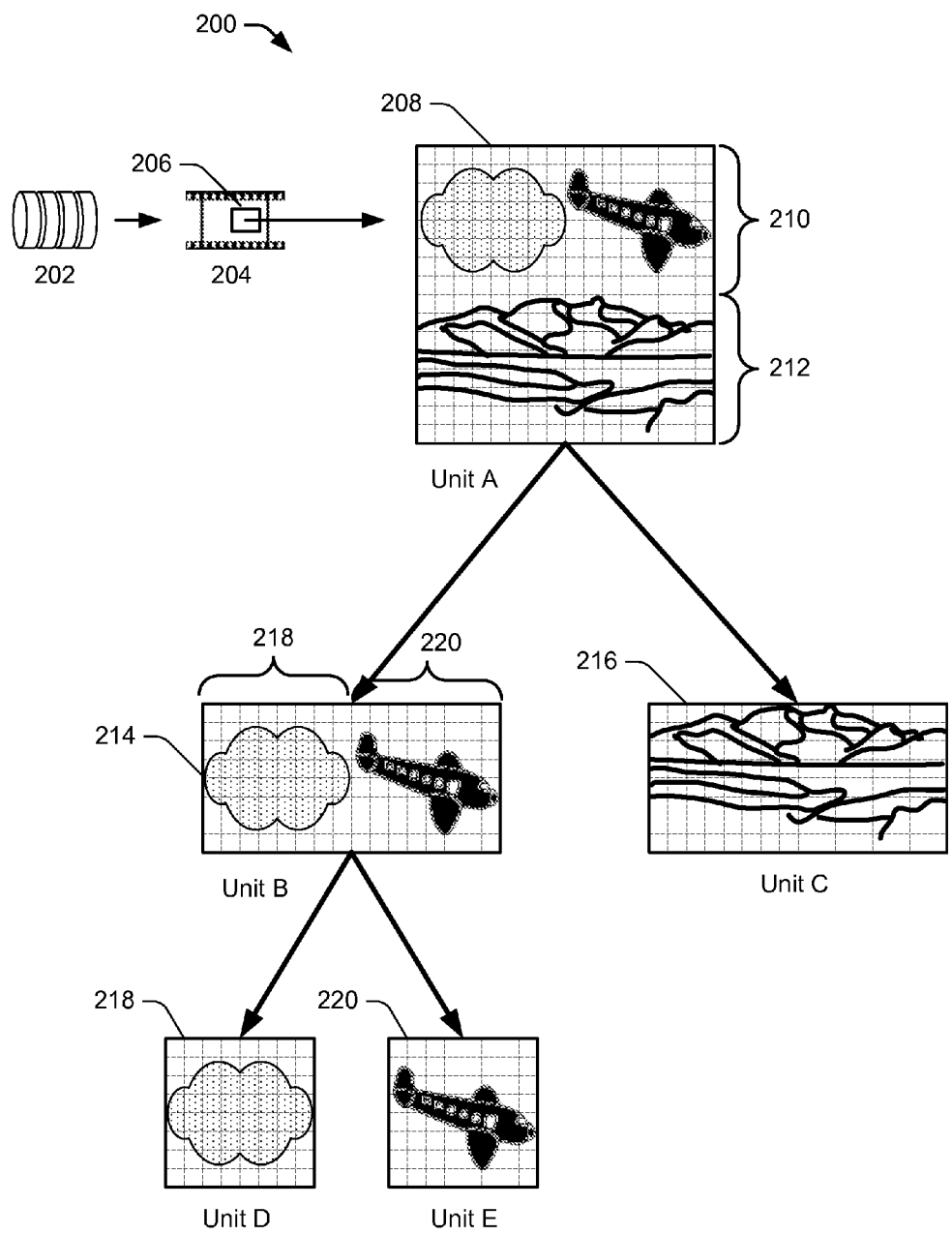
FIG. 2 shows an illustrative tree structure that represents a coding unit of video content having multiple attributes.

FIG. 2 illustrates an example tree structure 200 that may be used to implement video coding redundancy reduction techniques. For instance, the encoder 114 and/or decoder 126 of FIG. 1 may be configured to support such video coding redundancy reduction techniques.

In general, video content 202 includes a series of video frames 204. The encoder 114 may operate on a unit 206 of pixels within the video frames 204 of the video content 202 to encode the video content. The unit 206 may have fixed or varying sizes, and may differ in size according to a specified coding standard. FIG. 2 depicts unit 206 as being example block A 208 (i.e., a 16×16 block of pixels). Block A 208 may be further divided into several sub-regions depending on statics of the block. For instance, if block A 208 has two different kinds of statistics, then block A 208 would be divided into separate sub-regions based on those statics. On the other hand, if block A 208 has uniform statistics, then it would not be divided into separate sub-regions.

As illustrated in FIG. 2, since a top half 210 of block A 208 is of a darker color compared with a bottom half 212 of block A 208, the tree structure 200 depicts block A 208 as being divided into block B 214 and block C 216, each of which have an 8×16 pixel size. In addition, since block B 214 also has varying statistics (i.e., a left hand side 218 of block B 214 is lighter in color compared with a right hand side 220 of block B 214), then block B 214 is further divided into block D 222 and block E 224, each of which have an 8×8 pixels size. Since block C 216 is of uniform statistics, block C 216 is not divided any further.

In the tree structure 200, each block is considered a node of the tree and the leaf nodes (e.g., block C 216, D, and E) have uniform statistics. Each frame of the video content 202 may be represented by a unique tree structure based on the statistics of the images within the frames. Since the encoder 114 uses the tree structure as a basis for encoding the video content 202, it may be desirable to represent the tree structure using flag symbols. For instance, let S(X) denote the splitting flag for node X of a tree structure, where S(X)=1 means the node is split and S(X)=0 means that the node is not split (i.e., the block for that node is of uniform statistics). Further, let A(X) denote the attribute of node X. The encoder 144 may reduce redundancy in video coding by sending attribute symbols associated with S(X)=0 nodes to the decoder. For example, the attribute symbols that may be sent to the decoder 126 for the tree structure 200 are S(A)=1, S(B)=1, S(D)=0, A(D), S(E)=0, A(E), S(C)=0, A(C).

Previous video coding techniques send symbols (i.e., bits) for every leaf node of the tree structure. In some situations however, there may be redundancy in these previous video coding techniques. For example, if node X is split into nodes $X_1, X_2, \ldots, X_n$, and $X_1, X_2, \ldots, X_{n-1}$ have the same statistics, it follows that node $X_n$ has a different statistic. Otherwise the representation is inefficient (i.e., node X should not be divided). Thus, symbols for node $X_n$ should not be sent to the decoder when $X_1, X_2, \ldots, X_{n-1}$ have the same statistics since node $X_n$ has a different statistic. Accordingly, the tree structure redundancy reduction techniques analyze the statistics of preceding nodes to determine whether or not symbols for the last leaf node should be sent to the decoder.

In video coding, the tree structure may take different forms since there are many different ways to represent the video content 202. For example, in the coded-block-flag case, the tree structure may include coded-block-flags (CBF) where each node has a corresponding transform coefficient. As another example, in the merge-and-skip case, the tree structure may represent the video content as coding units (CU) where each node has a corresponding motion information (e.g., motion vectors, etc.). As a further example, in the adaptive-loop-filter (ALF) case, the tree structure may include adaptive loop filter (ALF) flags where each node has a corresponding ALF flag. As further illustrated below in FIGS. 3-5, the tree structure video coding redundancy reduction techniques may be applied to any tree structure regardless of its form.

Coded-Block-Flag (CBF)

As noted above, a tree structure is generated based on units (i.e., pixels) of video frames 204 of the video content 202. In some instances, a transform may be performed on the tree structure such that the nodes of the tree structure may represent the predicted residue of the transform. In such instances, the attributes, A(X), of the nodes are coded-block-flags (CBF), which reflect whether the residue within a node is zero or not. For instance, A(X)=0 means that the residue within node X is zero and A(X)=1 means that there are non-zero residue within the node. If a node does not have any non-zero transform coefficients, then that node is not divided. The encoder 114 then uses the transform coefficients to determine whether to encode the blocks of the tree structure. For example, if a block C 216 contains no non-zero significant coefficients, then the coded-block-flag (CBF) for that block is sent to the decoder 126 for coding.

In some instances, there may be redundancy in the CBF attributes of the tree structure. For example, if node X is split into nodes $X_1, X_2, \ldots, X_n$, and $A(X_1)=A(X_2)=\ldots=A(X_{n-1})=0$, then is follows that $A(X_n)$ is 1. In such instances, it would be redundant to send the CBF attribute for the last node to the decoder 126. Accordingly, the tree structure redundancy reduction techniques improve the efficiency of video coding by analyzing the CBF attributes of the tree structure and determining whether the CBF attribute of the last node should be sent to the decoder 126. When each preceding node has a CBF flag A(X)=0, then the last node is not submitted to the decoder.

FIG. 3 is an illustrative coded-block-flag tree structure 300. The attributes A(A)=1 302 and A(B)=1 304 are applied to block A 208 and block B 214 since these blocks are divided. Using the tree structure redundancy reduction techniques, the CBF attributes of the nodes are analyzed. Since the coefficients of block D 222 are zero, then it follows that block E 224 has non-zero coefficients otherwise block B would not have been divided. Accordingly, the data symbols for block E 224 is not sent to the decoder 126. In other words, when each preceding node of a divided block has coefficients of zero, the last node has non-zero coefficients otherwise that node would not have been divided.

Merge-and-Skip

In merge-and-skip, the tree structure represents the video content 202 as coding units (CU) based on motion information (e.g., motion vectors, etc.) of the unit 206. For each node of the tree structure, if the CU does not have uniform motion information, it is divided into sub-CUs or prediction units (PUs). When it comes to video coding of tree structures that are based on motion information, one CU symbol is used for each node to indicate whether or not that node has the same motion information as a former node. In some instances, there may be redundancy in the CU attributes of the tree structure. For instance, if the former CUs have the same motion information, then it follows that the last CU has different motion information. For example, if node X is split into nodes $X_1, X_2, \ldots, X_n$, and each preceding node (i.e., $X_1, X_2, \ldots, X_{n-1}$) has the same motion information, then the data symbol for the last node (i.e., $X_n$) is not sent to the decoder 126 thus making the video coding more efficient. Accordingly, if the video coding standards dictate that a data symbol is required for each node to indicate whether that node has the same motion information as either the previous node or the upper node, then the tree structure redundancy reduction techniques determine, based on the motion information of the previous nodes, whether to send a data symbol for the last node to the decoder.

In some instances, former CUs have the same motion information. In such instances, the motion information of the last CU is different from the former CUs. Accordingly, when the motion information of the last CU is different from the former CUs, the bit(s) to indicate whether the last CU has the same motion information with the former CUs does not need to be sent to the decoder. In other instances, the former CUs have the same motion information and the motion prediction of the last CU is the same with the former CU's motion information. In such instances, the last CU should not be skip mode. In other words, the bit(s) to indicate whether the last CU is skip mode is not transmitted to the decoder. In other instances, if the former CUs have the same motion information, the last CU is skip mode, and one of the motion information predictor of the last CU is identical to the former CU's motion information, this motion information predictor can be removed from the set of the last CU's motion information predictors.

FIG. 4 is an illustrative merge-and-skip tree structure 400. In the merge and skip tree structure 400, each node may have motion information. The division of the node into sub-regions is based on whether or not the node has uniform motion information. For example, in block B 214, first motion information 402 is downwards and second motion information 404 is to the right. Since block B 214 has non-uniform motion information, block B 214 is divided into block D 222 and block E 224. If a block is divided into sub-regions, then each of those sub-regions has different motion information. For example, since block B 214 is subdivided into block D 222 and block E 224, it follows that the motion information for block D 222 (e.g., a downward motion information 406) is different from the motion information for block E 224 (e.g., a rightward motion information 408).

Using the reduced redundancy techniques, if a node is divided and if each preceding sub-region of that node has the same motion information, then last sub-region has different motion information. For example, in the merge-and-skip tree structure 400, since the motion information of block D 222 is downward, then block E 224 has a non-downward motion information otherwise block B 214 would not have been divided. Accordingly, the data symbol for block E 224 does not have to be sent to the decoder 126.

Adaptive Loop Filter (ALF)

In the adaptive-loop-filter (ALF) case, the tree structure represents the video content 202 using ALF flags which reflect whether ALF is adopted on a node or not. For instance, $A(X)=1$ means that ALF is adopted on that node while $A(X)=0$ means that ALF is not adopted. In some instances, there may be redundancy in the ALF attributes of the tree structure. For instance, if node X is split into nodes $X_1, X_2, \ldots, X_n$, and $A(X_1)=A(X_2)=\ldots=A(X_{n-1})=1$ (i.e., each preceding node uses the ALF), then $A(X_n)$ is 0 (i.e., the last node does not use the ALF). Additionally, if node X is split into nodes $X_1, X_2, \ldots, X_n$, and $A(X_1)=A(X_2)=\ldots=A(X_{n-1})=0$ (i.e., each preceding node does not use the ALF), then $A(X_n)$ is 1 (i.e., the last node uses the ALF). Accordingly, under either of these situations, the ALF attributes can be analyzed to determine whether or not data symbols for the last node should be sent to the decoder 126.

FIG. 5 is an illustrative adaptive-loop-filter (ALF) tree structure 500. The attribute $A(B)=1$ 502 is applied to block B 214 meaning that some parts of block B 214 use the ALF. Since the ALF of block D 222 is 0 (i.e., $A(D)=0$), then the ALF of block E 224 is 1 (i.e., $A(E)=1$) otherwise block B 214 would not have been divided. Accordingly, the data symbols for block E 224 do not have to be sent to the decoder 126. In other words, since each preceding node does not use the ALF, then we know that for the last node (i.e., block E 224), the ALF is used otherwise that region would not be divided. Likewise, in situations where each preceding sub-regions uses the ALF, then the last sub-region does not use the ALF in some instances.

Bidirectional Prediction

Generally, when video content is presented for encoding, each frame within the video content 202 may be processed in units of macroblocks. For instance, each macroblock can be encoded using an intra prediction mode, an inter prediction mode, or any combination thereof. Regardless of the prediction mode, a prediction unit may be formed based on a reconstructed frame. In the case of intra-prediction, for example, a prediction macroblock C 216 can be formed from samples in the current frame that have been previously encoded. In the case of inter-prediction, for example, a prediction macroblock C 216 can be formed from one or more previous or future frames (i.e. reference frames) that have already been encoded and reconstructed. Further, alternate embodiments can encode a macroblock B 214 by using some combination of both intra prediction and inter prediction.

Bidirectional prediction involves a combination of intra-prediction and inter-prediction. Specifically, three modes (one bidirectional and two unidirectional) are applied to two lists of references frames to predict each prediction unit in the current reference frame. In some situations the first list and the second list may contain same reference frames. For instance, the reference frames may be the same when the two lists contain identical reference frames. In such instances, the two unidirectional modes are identical. Accordingly, the video coding redundancy reduction techniques improve the efficiency of bidirectional prediction video coding by disabling the third mode (i.e., the second unidirectional mode) in situations where the two lists contain same reference frames.

FIG. 6 illustrates example bidirectional prediction lists 600 that may be used in accordance with the bidirectional prediction video coding redundancy reduction techniques. For instance, the encoder 114 and/or decoder 126 of FIG. 1 may be configured to support such bidirectional prediction video coding redundancy reduction techniques.

The bidirectional prediction lists 600 include a first list 602 (i.e., list 0) and a second list 604 (i.e., list 1). Each of the lists contains reference frames. For instance, the first list 602 includes reference frames 606(1) . . . (n) and the second list 604 includes reference frames 608(1) . . . (m). In bidirectional prediction, the first list 602 and the second list 604 are used to form the prediction for each image block in a current frame 610. Specifically, three prediction modes are applied to the lists to predict the current frame. In a first mode 612, two reference frames (e.g., $606(x)$ and $608(y)$) are selected, one from the first list 602 and the other from the second list 604. Then an average or a weighted average of these two reference frames is calculated to predict the current frame 610. In a second mode 614, one reference frame (e.g., $606(x)$) is selected from the first list 602 and this reference frame is the sole frame that is used to predict the current frame. In a third mode 616, one reference frame (e.g., $608(y)$) is selected from the second list 604 and this reference frame is the sole frame that is used to predict the current frame 610.

In some instances, the first list 602 and the second list 604 contain same reference frames. In such situations, any prediction from the reference frames of the first list 602 can also be found in the reference frames of the second list 604. Accordingly, in such situations, the second mode 614 becomes redundant to the third mode 616. Whereas previous bidirectional prediction video coding techniques use all three modes regardless of the content of the first list 602 and the second list 604, the bidirectional prediction redundancy reduction techniques described herein disable the third mode 616 when the first list and the second list contain the same reference frames (e.g., the two lists are identical). Accordingly, such bidirectional prediction redundancy reduction techniques improve the efficiency of bidirectional prediction video coding by sending less data to the decoder 126.

One example of how the bidirectional prediction redundancy reduction techniques can be applied to video coding involves the low-delay slice case. In typical bidirectional prediction, one reference frame is selected prior to the current frame 610 and one reference frame is selected after the current frame. However, for the low-delay case, reference frames prior to the current frame 610 are selected. In other words, reference frames after the current frame 610 are not typically used in the low-delay case. In such situations, it may still be desirable to use bidirectional prediction. However, since reference frames after the current frame 610 are not selected, the second list 604 becomes identical to the first list 602 thus making the second mode 614 and the third mode 616 redundant. Previous video coding solutions fail to detect this redundancy and consequently use all three modes even though the second and third modes are redundant. The bidirectional prediction redundancy reduction techniques disable the third mode 616 in such situations, thus making the video coding more efficient.

Illustrative Processes

Figure 7:
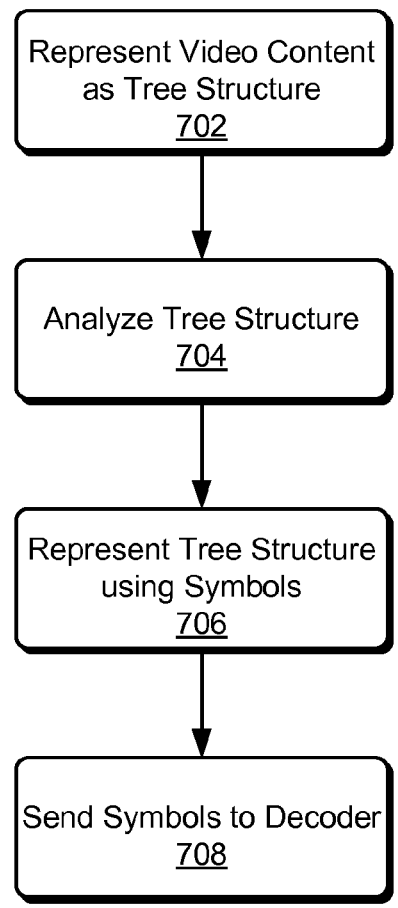
FIG. 7 is a flow diagram that illustrates tree structure redundancy reduction techniques, in accordance with various embodiments.
Figure 8:
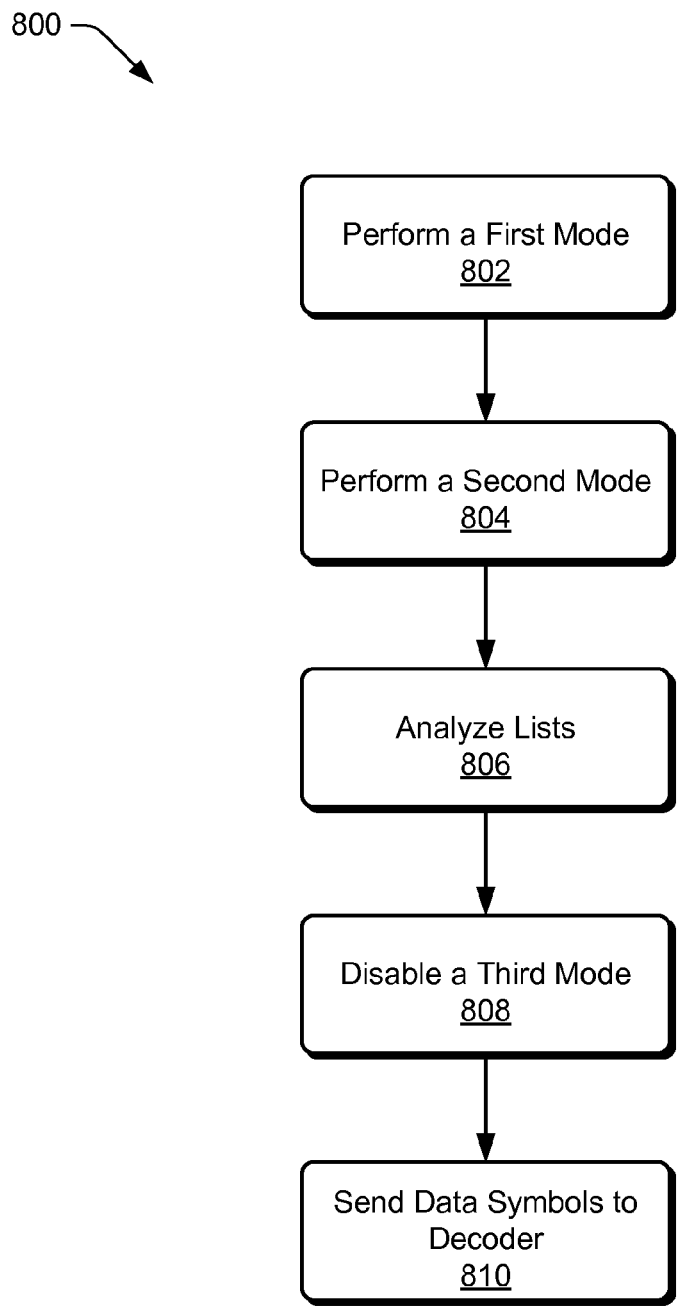
FIG. 8 is a flow diagram that illustrates bidirectional prediction redundancy reduction techniques, in accordance with various embodiments.

FIGS. 7-8 describe illustrative processes for reducing redundancy in video coding. The order in which the operations are described in each illustrative process is not intended to be construed as a limitation, and any number of the described blocks can be combined in any order and/or in parallel to implement each process. Moreover, the blocks in FIGS. 7-8 may be operations that can be implemented in hardware, software, and a combination thereof. In the context of software, the blocks represent computer-executable instructions stored on one or more computer-readable media that, when executed by one or more processors, cause one or more processors to perform the recited operations. Generally, computer-executable instructions include routines, programs, objects, components, data structures, and the like that cause the particular functions to be performed or particular abstract data types to be implemented.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

FIG. 7 describes an illustrative process 700 to reduce redundancy in tree structure video coding in accordance with various embodiments. In some instances, the process 700 may be implemented by the source device 102. Alternatively, in some situations, the process may be implemented by the client device 106 or any combination of the source device and the client device.

At 702, the encoder 114 represents a video content as a tree structure. In some instance, the encoder 114 may use a unit of a reference frame of the video content 202 and present a hierarchical structure of nodes of the unit. The encoder 114 may divide each node into sub-regions based on statistics of the node. For instance, if the node contains non-uniform statistics, the node may be divided into multiple sub-regions. In some instances, each leaf node of the tree structure is of uniform statistics.

The tree structure may take any form to represent the video content 202. For instance, the tree structure may include coded-block flags (CBF) where each node has a corresponding transform coefficient. Alternatively, the tree structure may include motion vectors where each node has a corresponding motion vector. Alternatively, the tree structure may include adaptive-loop-filter (ALF) flags where each node has a corresponding ALF flag.

At 704, the encoder 114 analyzes the tree structure. In some instances, the encoder 114 may analyze the statistics of the nodes that make up the tree structure. In some instances, the encoder 114 additionally determines whether each node preceding a last node of a divided node has the same statistics at 704.

At 706, the encoder 114 represents at least a portion of the tree structure using data symbols. The data symbols may be associated with attributes of the nodes. For example, if the tree structure includes coded-block-flags (CBF), then the data symbols may take the form of A(X)=1 or A(X)=0 based on the residue within a node (e.g., A(X)=0 means that the residue within node X are zero and A(X)=1 means that there are non-zero residue within node X). As another example, if the tree structure includes motion information, then the data symbols may be associated with a coding unit (CU) depicting whether a node has uniform motion information. As a further example, if the tree structure includes adaptive loop filter (ALF) flags, then the data symbols may take the form of A(X)=1 or A(X)=0 based on whether the ALF flag is adopted within a node (e.g., A(X)=1 means that the ALF flag is adopted within node X and A(X)=0 means that the ALF flag is not adopted within node X).

At 708, the encoder 114 sends the data symbols to the decoder 126 based on the analysis. For instance, if the encoder 114 determines that each node preceding a last node of a divided node has the same statistics at 704, then the encoder may refrain from sending the data symbols associated with the last node to the decoder 126. If each node preceding a last node of a divided node has the same statistics then it follows that the last node has a different statistic and thus it would be redundant to send the data symbols associated with the last node to the decoder. In other words, the encoder 114 may use the analysis to reduce redundancy of video coding.

FIG. 8 describes an illustrative process 800 to reduce redundancy in bidirectional prediction video coding in accordance with various embodiments. In some instances, the process 800 may be implemented by the source device 102. Alternatively, in some situations, the process may be implemented by the client device 106 or any combination of the source device and the client device.

In general, bidirectional prediction video coding utilizes two lists of reference frames to predict each prediction unit in a current reference frame. Specifically, three modes are applied to the two lists of reference frames in which the first mode 612 is bidirectional and the second two modes are unidirectional.

At 802, the encoder 114 performs the first mode 612 of bidirectional prediction. The encoder 114 may select a first reference frame from the first list 602 and a second reference frame from the second list 604 and then calculate an average or a weighted average of the first reference frame and the second reference frame at 802 to perform the first mode 612 of bidirectional prediction.

At 804, the encoder 114 performs the second mode 614 of bidirectional prediction. The encoder 114 may select a reference frame from the first list 602 and then use the reference frame from the first list to predict the current frame 610 at 804 to perform the second mode 614 of bidirectional prediction.

At 806, the encoder 114 may analyze the lists of reference frames. In some instances, the encoder 114 may determine that the reference frames of the first list 602 are same to the reference frames of the second list 604 at 806 based on the analysis. For instance, the lists may contain same reference frames when the two lists contain the same reference frames.

At 808, the encoder 114 may disable the third mode 616 of bidirectional prediction based on the analysis. For instance, if the encoder 114 determines that the reference frames of the first list 602 are same to the reference frames of the second list 604 at 806, then the encoder may disable the third mode 616 since the third mode becomes redundant to the second mode 614 when the lists are same (e.g., the two lists contain the same reference frames).

At 810, the encoder 114 may send data symbols associated with the bidirectional prediction to the decoder 126. In some instances, such as when the lists are same, the encoder 114 may send data symbols associated with the first mode 612 and the second mode 614 to the decoder while refraining from sending data symbols associated with the third mode 616 to the decoder.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A computer-implemented system for video coding that includes computer components stored in one or more computer readable storage devices and executable by one or more processors, the computer components comprising:
an encoder to analyze nodes of a tree structure, determine that a last node of a divided node of the tree structure has statistics different from each preceding node of the divided node, and send data symbols representing at least a portion of the nodes of the tree structure to a decoder while refraining from sending data symbols associated with the last node to the decoder.

2. The system of claim 1, wherein the encoder is further to represent a unit of a reference frame of video content as the tree structure, and wherein each leaf node of the tree structure has uniform statistics.

3. The system of claim 1, wherein the encoder is further to:
represent a unit of a reference frame of video content as the tree structure, each node of the tree structure being a coded-block-flags (CBF) in which a CBF value of 0 represents that a node has a zero residue and a CBF value of 1 represents that a node has a nonzero residue; and
refrain from sending a CBF attribute associated with the last node to the decoder when each of the preceding nodes has a CBF value of 0.

4. The system of claim 1, wherein the encoder is further to:
represent a unit of a reference frame of video content as the tree structure, each node of the tree structure being a coding unit (CU) based at least in part on motion information; and
refrain from sending a CU attribute associated with the last node to the decoder when each of the preceding nodes has the same motion information.

5. The system of claim 1, wherein the encoder is further to:
represent a unit of a reference frame of video content as the tree structure, each node of the tree structure being an adaptive-loop-filter (ALF) flag in which an ALF flag value of 1 represents that ALF is adopted on a corresponding node and an ALF flag value of 0 represents that ALF is not adopted on the corresponding node; and
refrain from sending an ALF flag attribute associated with the last node to the decoder when each of the preceding nodes has an ALF value of either 1 or 0.

6. A method, comprising:
representing video content as a tree structure, each leaf node of the tree structure having uniform statistics of the video content;
analyzing statistics of the tree structure;
determining, for a divided node of the tree structure, that a last node has statistics different from each preceding node;
representing at least a portion of the tree structure using data symbols; and
sending the data symbols to the decoder while refraining from sending data symbols associated with the last node to the decoder.

7. The method of claim 6, wherein the tree structure represents the video content as coded-block-flags (CBF) in which a CBF value of 0 represents that a node has a zero residue and a CBF value of 1 represents that a node has a nonzero residue, the determining determines that each of the preceding nodes has a CBF value of 0, and the sending refrains from sending a CBF attribute associated with the last node to the decoder.

8. The method of claim 6, wherein the tree structure represents the video content as coding units (CU) based at least in part on motion information, the determining determines that each of the preceding nodes has the same motion information, and the sending refrains from sending a CU attribute associated with the last node to the decoder.

9. The method of claim 6, wherein the tree structure represents the video content as adaptive-loop-filter (ALF) flags in which an ALF flag value of 1 represents that ALF is adopted on a corresponding node and an ALF flag value of 0 represents that ALF is not adopted on a corresponding node, the determining determines that each of the preceding nodes has an ALF flag value of 1, and the sending refrains from sending an ALF flag attribute associated with the last node to the decoder.

10. The method of claim 6, wherein the tree structure represents the video content as adaptive-loop-filter (ALF) flags in which an ALF flag value of 1 represents that ALF is adopted on a corresponding node and an ALF flag value of 0 represents that ALF is not adopted on a corresponding node, the determining determines that each of the preceding nodes has an ALF flag value of 0, and the sending refrains from sending an ALF flag attribute associated with the last node to the decoder.

11. One or more computer readable storage devices storing computer-executable instructions that, when executed, cause one or more processors to perform acts comprising:
analyzing statistics of a tree structure, the tree structure representing video content using nodes, each leaf node of the tree structure having uniform statistics of the video content;
determining that a last node of a divided node of the tree structure has statistics different from each preceding node of the divided node; and
sending data symbols associated with at least a portion of the nodes of the tree structure to the decoder while refraining from sending data symbols associated with the last node to the decoder.

12. The computer readable storage of claim 11, the acts further comprising representing the video content as the tree structure.

13. The computer readable storage of claim 11, the acts further comprising representing a portion of the tree structure the using data symbols.

14. The computer readable storage of claim 11, the acts further comprising representing the video content as the tree structure, wherein the nodes of the tree structure are coded-block-flags (CBF), wherein a CBF value of 0 represents that a node has a zero residue and a CBF value of 1 represents that a node has a nonzero residue, wherein the determining determines that each of the preceding nodes has a CBF value of 0, and wherein the sending refrains from sending a CBF attribute associated with the last node to the decoder.

15. The computer readable storage of claim 11, the acts further comprising representing the video content as the tree structure, wherein the nodes of the tree structure are coding units (CU) based at least in part on motion information, wherein the determining determines that each of the preceding nodes has the same motion information, and wherein the sending refrains from sending a CU attribute associated with the last node to the decoder.

16. The computer readable storage of claim 11, the acts further comprising representing the video content as the tree structure wherein the nodes of the tree structure are adaptive-loop-filter (ALF) flags, wherein an ALF flag value of 1 represents that ALF is adopted on a corresponding node while an ALF flag value of 0 represents that ALF is not adopted on the corresponding node, wherein the determining determines that each of the preceding nodes has an ALF flag value of either 0 or 1, and wherein the sending refrains from sending an ALF flag attribute associated with the last node to the decoder.

* * * * *